United States Patent [19]
Milne et al.

[11] Patent Number: 5,284,107
[45] Date of Patent: Feb. 8, 1994

[54] CABLE BOLT MONITORING DEVICE

[75] Inventors: Douglas Milne, Vancouver; Alain Condron, Ste-Catherine; Yves Potvin, Pincourt, all of Canada

[73] Assignee: Noranda Inc., Toronto, Canada

[21] Appl. No.: 14,483

[22] Filed: Feb. 8, 1993

[30] Foreign Application Priority Data

Mar. 9, 1992 [CA] Canada .................................. 2062543

[51] Int. Cl.5 ...................... F16B 31/02; E02D 33/00
[52] U.S. Cl. ........................................... 116/212; 33/1; 73/784; 411/8
[58] Field of Search ...................... 116/212, 281; 33/1; 73/784; 405/260, 272; 411/8, 9, 10

[56] References Cited

U.S. PATENT DOCUMENTS

| | | | |
|---|---|---|---|
| 3,150,557 | 9/1964 | Brown | 411/9 |
| 3,478,523 | 11/1969 | Reusser et al. | 411/9 X |
| 4,648,753 | 3/1987 | Stephen | 411/8 X |
| 4,662,795 | 5/1987 | Clark et al. | 411/8 X |
| 4,971,493 | 11/1990 | Herbst et al. | 411/9 X |
| 5,185,595 | 2/1993 | Friesen | 73/784 X |

*Primary Examiner*—Daniel M. Yasich
*Attorney, Agent, or Firm*—Keck, Mahin & Cate

[57] ABSTRACT

A monitoring unit for installation on a cable bolt comprises a tube designed to fit within a cable bolt hole and having a collar at one end thereof, a cable bolt adapted to be grouted in the rock at the centre of the tube, a base plate placed tightly against the tube collar adjacent the rock face, a centralizer sleeve designed to fit over the cable bolt to keep the cable centralized within the base plate and tube, an elongated measuring plate having a centre hole for insertion of the cable bolt to fit tightly against the base plate and a groove cut at equal distances from each side of the centre hole for allowing the measuring plate to bend if the rock moves with respect to the cable bolt, and a cable clamp for fixing the measuring plate tight against the base plate.

3 Claims, 3 Drawing Sheets

CABLE BOLT MONITORING DEVICE

This invention relates to a monitoring unit for installation on a cable bolt to warn of approaching instability.

The use of cable bolts for support in underground mining is widespread. Steel cables are used to reenforce the rock mass. They are installed in holes drilled in the rock and bonded to the rock with grout. Failure of cable bolts as support members, however, commonly occurs through failure of the cable grout bond. This failure usually results in a potentially unstable block of rock moving down with the grout column, relative to the steel cable. This represents a safety hazard for mine workers. Monitoring and warning units have been developed to warn of relative movement between the rock mass and support members for various support types, as evidenced by U.S. Pat. No. 4,426,642. However, most of the existing warning units have been developed for coal mining environment, which does not rely on drilling and blasting as a method of extraction. The regular blasting induces enough vibration in the rock to trigger the warning devices giving a false alarm which make them impractical in a drill and blast environment.

Other devices can measure the relative deformation between the rock surface and a rockbolt anchor (Ground Movement Monitor GMM), or between two anchors (extensometer). These devices must, however, be read with a potentiometer or a micrometer and do not provide visual warning to mine workers. As well, they are not designed to be mounted on a cable bolt.

It is the object of the present invention to provide a monitoring and warning unit to indicate the presence and magnitude of sliding of the rock mass and grout column around cable bolts which are in a state of yielding.

The monitoring unit, in accordance with the present invention, comprises a tube designed to fit within a cable bolt hole and having a collar at one end thereof, a cable bolt adapted to be grouted in the rock at the centre of the tube, a base plate placed tightly against the tube collar adjacent the rock face, a centralizer sleeve designed to fit over the cable bolt to keep the cable centralized within the base plate and tube, an elongated measuring plate having a centre hole for insertion of the cable bolt to fit tightly against the base plate and a groove cut at equal distances on each side of the centre hole for allowing the measuring plate to bend if the rock mass around the cable bolt moves down relative to the cable bolt, and a cable clamp for fixing the measuring plate tight against the base plate.

The tube is preferably a split tube so that the halves of the split tube can be spread apart to achieve a tight fit of the tube within the hole to hold the tube prior to grouting.

The tube collar is preferably threaded and the base plate provided with a collar portion which is threaded into the collar of the tube for accurate positioning of the base plate with respect to the measuring plate.

The invention will now be disclosed, by way of example, with reference to the accompanying drawings in which.

Figure 1:
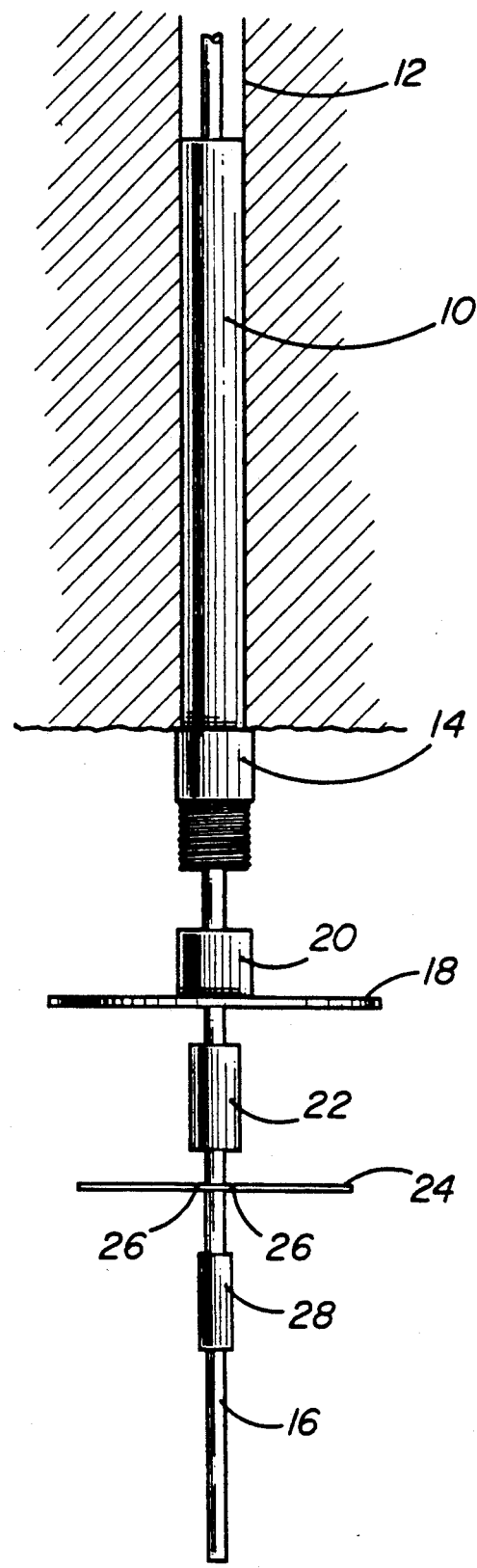
FIG. 1 is an exploded view of the monitoring unit in accordance with the present invention.

Referring to the drawings, there is shown a split tube 10 which is designed to fit within a cable bolt hole 12 drilled in the rock. The halves of the split tube can be spread apart to achieve a tight fit of the tube within the hole to hold the tube prior to grouting. The lower portion of the tube is provided with a collar 14 for a purpose to be disclosed later. A cable bolt 16 is inserted into the cable bolt hole and extends into the rock past the upper end of the tube. A base plate 18 is placed tightly against the tube collar and positioned as close as possible against the rock face. The plate is preferably a 20 cm. disc with a central hole having a diameter sufficient to allow the cable bolt to pass. The base plate is provided with a collar portion 20 which is threaded into the split tube collar for a purpose to be disclosed later.

A centraliser sleeve 22 is designed to fit over the cable bolt to keep the cable bolt centralized within the base plate and split tube.

An elongated measuring plate 24 having a central hole for insertion into the cable bolt is fitted tightly against the base plate. The measuring plate has a groove 26 on each side of the central hole to allow the plate to bend if the rock mass moves down relative to the cable bolt.

A clamp 28 is provided on the cable for holding the measuring plate against the base plate.

The above disclosed monitoring unit operates as follows:

The halves of the split tube 10 are spread apart so as to achieve a tight fit within the cable bolt hole 12 and the tube is inserted into the cable bolt hole a distance such that the collar 14 of the tube is flush with the rock face. The cable bolt 16 is inserted in the hole and grouted in the usual manner. The base plate 18 is inserted into the cable bolt and threaded onto the collar of the tube. The centralizer sleeve 22 is fitted over the cable bolt so as to centre the cable bolt within the base plate and tube. The cable bolt is left alone until the cement has dried. The measuring plate 24 is then inserted into the cable bolt and placed in contact with the base plate. The cable clamp 28 is finally installed on the cable bolt for fixing the measuring plate tight against the base plate.

Figure 2:
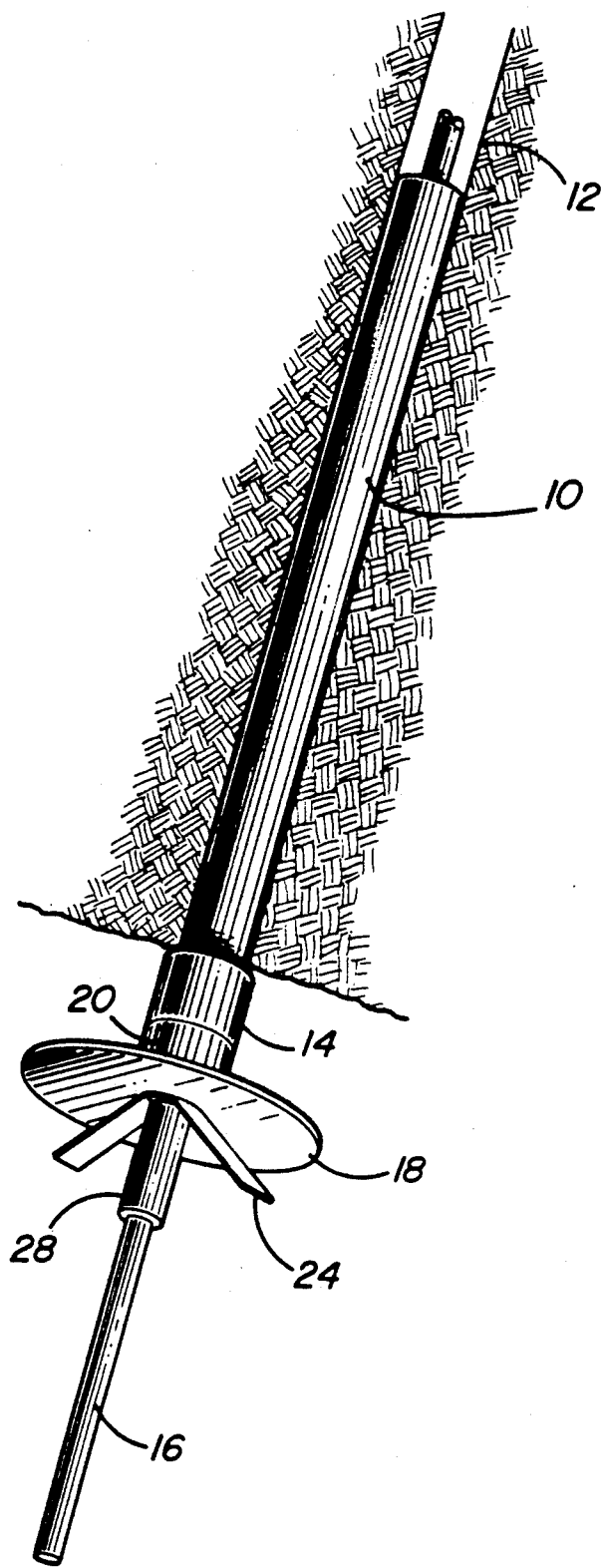
FIG. 2 is an assembled view of the unit illustrating the unit response to relative movement of the rock with respect to the cable bolt.
Figure 3:
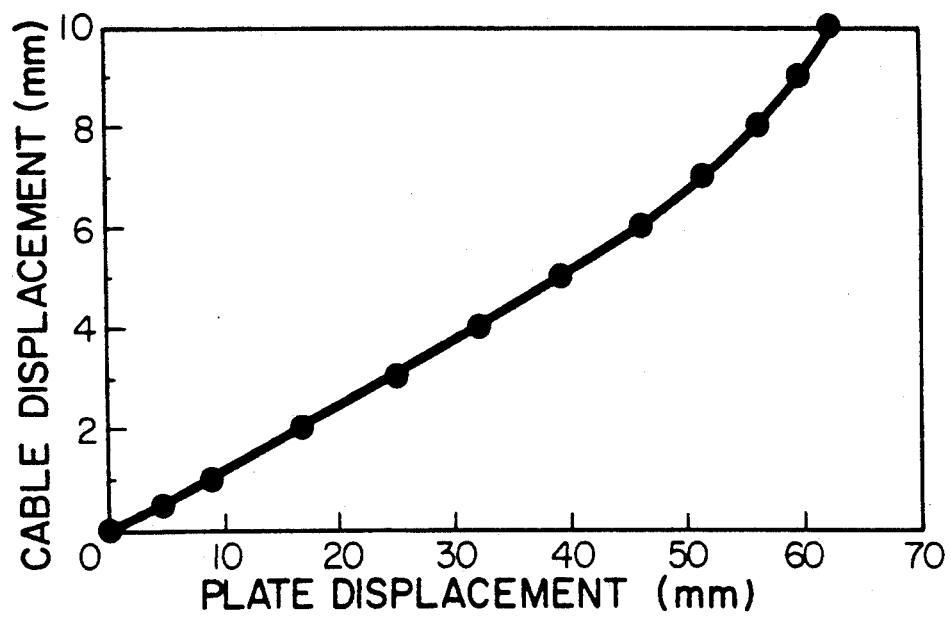
FIG. 3 is a calibration curve relating measured displacement to actual movement.

If for any reason the measuring plate is not tight against the base plate once the cable clamp is installed, the base plate is unscrewed slightly until it is in a tight position. Thus, if there is any subsequent movement of the rock mass relative to the cable bolt, the measuring plate will be bent at the grooves and the ends of the plate will be displaced away from the base plate, as shown in FIG. 2 of the drawings. Such displacement may be visually seen. More importantly, it may be measured with a tape and translated into actual rock movement in accordance with a calibration curve shown in FIG. 3.

The monitoring device in accordance with the present invention differs from existing units because of the following characteristics:

(a) it can be mounted on a cable bolt;
(b) it can provide a visual warning of cable bolt support yielding;
(c) the magnitude of cable bolt yielding can be measured;
(d) the system is entirely mechanical, it has no wiring and is rugged;
(e) the system is not sensitive to blast vibration;

(f) the system is low cost.

Although the invention has been disclosed with reference to the description of a preferred embodiment, it is to be understood that it is not limited to such embodiment but that other alternatives are also envisaged within the scope of the following claims.

We claim:

1. A monitoring unit for installation on a cable bolt, comprising:
    (a) a tube designed to be securely fit within a cable bolt hole and having a tube collar near one end thereof;
    (b) a cable bolt adapted to be grouted in rock at the centre of the tube and extending past an upper end of the tube;
    (c) a base plate having a portion placed tightly against the tube collar adjacent the rock face;
    (d) a centralizer sleeve designed to fit over the cable bolt to keep the cable bolt centralized within the base plate and tube;
    (e) an elongated measuring plate having a centre hole for insertion of the cable bolt to fit tightly against the base plate and a groove cut at equal distances from each side of the centre hole for allowing the measuring plate to bend if the rock moves with respect to the cable bolt; and
    (f) a cable clamp for fixing the measuring plate tight against the base plate.

2. A monitoring device as defined in claim 1, wherein the tube is a split tube so that the halves of the split tube can be spread apart to achieve a tight fit within the hole.

3. A monitoring device as defined in claim 1, wherein the tube collar is threaded and wherein the base plate is provided with a collar which is threaded into the collar of the tube for accurate positioning of the base plate with respect to the measuring plate.

* * * * *

UNITED STATES PATENT AND TRADEMARK OFFICE
CERTIFICATE OF CORRECTION

PATENT NO. : 5,284,107
DATED : February 8, 1994
INVENTOR(S) : Milne, et. al.

It is certified that error appears in the above-indentified patent and that said Letters Patent is hereby corrected as shown below:

Title page, item [75], inventor: change the second inventor's name from "Condron" to --Gendron--.

Signed and Sealed this

Thirtieth Day of August, 1994

*Attest:*

BRUCE LEHMAN

*Attesting Officer*   *Commissioner of Patents and Trademarks*